United States Patent

[11] 3,571,745

[72] Inventors Daniel E. Altman;
Myer Geller; Thomas A. DeTemple, San Diego, Calif.
[21] Appl. No. 696,732
[22] Filed Jan. 10, 1968
[45] Patented Mar. 23, 1971
[73] Assignee The United States of America as represented by the Secretary of the Navy

[54] PULSE-CHARGING COUPLING LASER APPARATUS
9 Claims, 6 Drawing Figs.
[52] U.S. Cl. .................................................. 331/94.5,
313/217, 315/241, 333/26, 333/84
[51] Int. Cl. ...................................................... H01s 3/09,
H01s 3/22
[50] Field of Search ........................................ 331/94.5;
313/217; 315/241; 333/26, 84 (Laser Bibliography), (Chem. Abstr.), (Star), (AIAA)

[56] References Cited
UNITED STATES PATENTS

| | | | | |
|---|---|---|---|---|
| 2,946,923 | 7/1960 | Fitch | | 315/241X |
| 3,078,386 | 2/1963 | Fischer | | 315/241X |
| 3,211,940 | 10/1965 | Hueschen | | 313/217X |
| 3,229,145 | 1/1966 | Jensen | | 313/217X |
| 3,311,850 | 3/1967 | Podell | | 333/26X |
| 3,320,478 | 5/1967 | Harrison | | 313/217X |
| 3,381,139 | 4/1968 | McLeod, Jr.; et al. | | 307/106 |
| 2,936,390 | 5/1960 | Melhart | | 315/241X |

OTHER REFERENCES

Kimbark, " Electrical Transmission of Power and Signals," J. Wiley & Sons (New York), 1959, p 221

Geller et al. " A Pulsed, Coaxial Transmission Line Gas Laser," J. Appl. Phys. 37, (9), Aug. 1966, pp 3639— 40

*Primary Examiner*—Ronald L. Wibert
*Assistant Examiner*—R. J. Webster
*Attorneys*—R. S. Sciascia, G. J. Rubens and J. W. McLaren ABSTRACT: An improved laser apparatus is disclosed which employs a pulse-charging coupling connected in circuit between a pulse generator means and an excitation medium which is employed to excite a laser material to a lasing level. The laser disclosed preferably comprises a source of electrical power, a pulse generator which may take the form of a pulse-forming network together with a switch means, and an appropriate form of pulse-charging coupling connected between the pulse generator and the medium which is to be excited to raise the lasing material to a lasing level.

The pulse-charging coupling performs the function of impressing pulsed electrical energy upon a medium such as gas, for example, with significantly improved efficiency to optimize the lasing phenomenon. The concept of the disclosure which teaches the use of a pulse-charging coupling is readily adapted to, and ideally suited for employment in producing the most favorable impedance matching relationships of the laser apparatus which in itself contributes significantly to the efficiency of the transfer of energy from an electrical power source to produce optimized laser power output.

Several forms of pulse-charging couplings are disclosed and described including a flat, parallel plate type which may comprise a dual ground plane and transmission line portion; a multiple conductor coaxial form of pulse-charging coupling is also described and illustrated in the disclosure.

PATENTED MAR 23 1971 3,571,745

INVENTORS
DANIEL E. ALTMAN
MYER GELLER
BY THOMAS A. DETEMPLE

ATTORNEYS

PULSE-CHARGING COUPLING LASER APPARATUS

STATEMENT OF GOVERNMENT INTEREST

The invention described herein may be manufactured and used by or for the Government of the United States of America for governmental purposes without the payment of any royalties thereon or therefor.

CROSS-REFERENCES TO RELATED APPLICATIONS

U.S. Pat. No. 3,458,830 titled "Transmission Line Gas Laser," filed Oct. 18, 1966, and issued Jul. 29, 1969 in the names of Myer Geller and Daniel E. Altman, discloses a transmission line type of gas laser which may be pulsed and caused to operate most efficiently by employing the teachings and advantages of the present invention.

U.S. Pat. No. 3,470,493 titled "Laser Energy Pump" which employs an Extension of a Coaxial Transmission Line, filed Oct. 18, 1966 and issued Sept. 30, 1969 in the names of Daniel E. Altman and Myer Geller, teaches a unique related concept which lends itself to the employment of the advantages and features of the present invention to affect maximum efficiency of operation.

U.S. Pat. application, Ser. No. 696,733 titled "Improved Pulsed Laser Apparatus," filed on the same date as the instant application in the names of Thomas A. DeTemple, Daniel E. Altman and Myer Geller, discloses a particularized concept involving impedance matching of the several elements of the laser apparatus for optimizing the laser power output. The concept of the present invention and its teachings may be advantageously employed together with the disclosures, teachings and concepts of the above mentioned related patent applications.

BACKGROUND OF THE INVENTION

In the past, conventional pulsed lasers have been powered to an excitation level by the method of charging a capacitive means to a relatively high potential and then causing the charged capacitance to discharge across the electrodes of the exciting medium such as a gas plasma tube. Even at its optimum performance, the capacitor discharge technique of impressing relatively large amounts of electrical energy upon a laser excitation medium has a number of inherent disadvantages. For example, the capacitor discharge method develops an exponential form of current rise time when pulsed conduction takes place. By contrast, it is highly desirable to generate an extremely steep rise time form of current pulse rather than the exponential form.

Moreover, conventional circuits employed in the past to connect the source of electrical energy to the laser exciting medium have been characterized by high inductances resulting in undesirable power dissipation rather than maximum power transfer to generate optimum laser power output. The so-called transmission line type of pulsing apparatus has been devised for lasers having as its objective the more efficient transfer of electrical power to the laser medium. The transmission line form of pulsing apparatus may be one of several types such as the coaxial transmission line or the flat parallel plate transmission line. In recently developed pulsed lasers the transmission line is usually employed in combination with a pulse generator which, in itself, may comprise a pulse-forming network in the form of a portion of the transmission line and an appropriate switching means such as a spark-gap switch. The spark-gap switch may be contained in an appropriate gas medium such as nitrogen, for example.

Additionally, the spark-gap switch may comprise a plurality of pairs of oppositely positioned electrodes to increase the transfer of energy across multiple spark-gaps. An independent source of electrical energy may be employed as a trigger to control the exact instant of time at which the spark gaps are caused to become conductive and thereby transmit pulsed energy for conduction by the laser exciting material. The multiple spark-gaps pose a problem in that the apparatus must be designed and operative to cause all the spark-gaps to become conductive at precisely the same instant in time; otherwise, the amount of energy transferred across the multiple spark gaps will be diminished which, of course, is not desirable because optimum laser power output may not be achieved.

SUMMARY OF THE INVENTION

The present invention conceives a pulse-charging coupling connected in circuit in a laser apparatus to accept a pulse of energy generated in an appropriate pulse generator and facilitate the buildup of maximum potential before lasing conduction occurs through a laser excitation material such as gas, for instance. The pulse-charging coupling operates to cummulatively accept the dynamic pulse energy formed by a pulse generator during the finite, but extremely short time when the impedance of the lasing medium is rapidly decreasing before it becomes fully conductive. Accordingly, a significantly higher "over voltage" is developed and a pulse source of lower impedance is provided particularly during the initial conduction of the lasing material, developing greater laser power output.

Moreover, the pulse-charging coupling in the form of multiple coaxial lines or a parallel plate transmission line is adapted to afford a desirable reduction of inductance as well as providing a determinable electrical impedance value for impedance matching purposes as is taught in the aforementioned related patent application.

In prior art pulsed laser apparatus, the pulse generator was primarily determinative of the pulsing action of the laser by reason of electrical conduction through the excitation medium such as gas, for example. As employed with the present invention, a pulse generator performs the functions of pulse forming and of triggering the pulse for transmission; the pulse-charging coupling connected in circuit between the pulse generator and the laser excitation medium, permits the exact instant of conduction of the pulse through the laser excitation medium to be determined by the buildup of the pulsed energy within the coupling to a point where the laser excitation medium such as a gas, for instance, reaches a conductive state as determined by its electrophysical composition and properties, thus exciting the laser to a lasing level.

Accordingly, it is a primary object of the present invention to provide an improved laser apparatus which obviates disadvantages inherent in certain prior art laser apparatus.

Another most important object of the present invention is to provide a pulse-charging coupling which together with the inherent characteristics of a conductive medium to be pulsed, such as a gas, for example, is determinative of the exact instant of pulsed conduction to raise a laser material to lasing level.

Another most important object of the present invention is to provide an improved laser apparatus which effectively eliminates diminished efficiency due to slightly different conduction times between a plurality of parallel connected switch means in pulsing the laser apparatus.

Yet another most important object of the present invention is to provide an improved laser apparatus which, by its nature, is readily and conveniently adaptable to impedance matching techniques to provide optimum laser power output.

A further object of the present invention is to accumulate a significantly increased order of electrical potential from a pulse generator before the laser excitation medium becomes conductive, thus impressing a high amplitude "over-voltage" on the medium as contrasted to its normal DC conductive breakdown.

Yet a further object of the present invention is to provide a pulse-charging coupling which is readily adapted to being embodied in a balun-type of dual ground plate configuration.

These and other objects, advantages, features and improvements of the present invention will be more fully appreciated from an understanding of the description of several embodiments which follows when taken together with the accompanying drawings and its scope will be defined more particularly in the appended claims.

The improved pulse laser apparatus of the present invention, in its essential elements, comprises a laser material adapted to be excited to a lasing level by the conduction of pulsed electrical current. Accordingly, the laser excitation medium may be the lasing element itself as, for instance, a gas laser comprising molecular nitrogen. However, the present invention is equally adaptable to certain semiconductor materials and also may be used as a laser energy pump in the manner disclosed, taught and claimed in the aforementioned U.S. Pat. No. 3,470,493 which employs an extension of a coaxial transmission line titled "Laser Energy Pump," and issued Sept. 30, 1969 filed Oct. 18, 1966 in the names of Daniel E. Altman and Myer Geller.

A source of electrical power is connected to a pulse generator. The pulse generator may include a pulse-forming network of appropriate configuration. In a preferred embodiment, the pulse-forming network may take the form of a portion of a coaxial transmission line, or a portion of a flat plate transmission line. The remaining portion of the pulse generator is a switch means which may typically be embodied in a spark gap switch of multiple form to afford conduction of relatively larger amounts of energy. The spark gap switch may be contained within air or an appropriate other medium such as a gas comprising nitrogen, for example.

The pulse-forming network and switch means are connected to form a pulse generator and multiple spark gaps of the switch means may be controllably actuatable for the conduction of pulses of electrical current flow from the network. Such control may be implemented, for instance, by an independent source of electrical power employed as a triggering means to cause conduction of pulses across the multiple spark-gaps. A pulse-charging coupling is connected from the switch means to the medium to be excited. The coupling is adapted to be charged with pulse energy until the electrical charge overcomes the impedance of the excitation medium and causes conduction therethrough. Thus, the pulse-charging coupling may be said to accumulate electrical energy until the charged amount of energy reaches an amplitude sufficient to overcome the impedance of the excitation medium. Upon conduction, a pulse of electrical current passes through the excitation medium, raising its energy level, and causing the laser to emit radiated energy at a lasing level.

DESCRIPTION OF THE PREFERRED EMBODIMENTS

Figure 1:
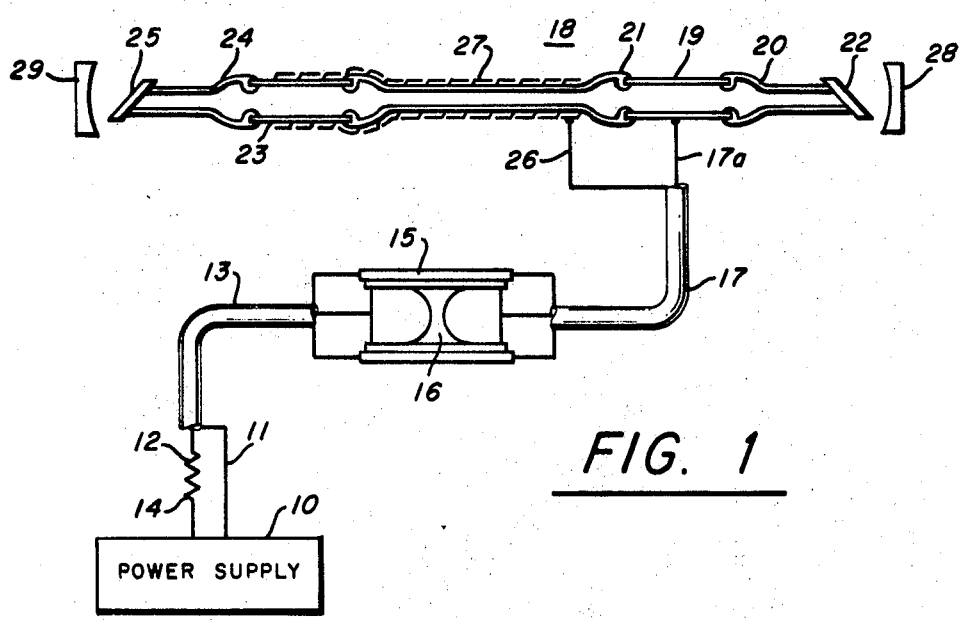
FIG. 1 is a schematic illustration of a coaxial transmission line laser embodiment of the present invention.

FIG. 1 illustrates an embodiment of the present invention as incorporated in a so-called coaxial-type of transmission line gas laser. The apparatus illustrated in FIG. 1 comprises a power supply 10 which is connected to an arrangement of coaxial cables 13. Typically, the power supply may be of the order of thirty or more kilovolts and the plurality of coaxial cables 13 may comprise ten or more in number. The outside conductors of the coaxial cables are connected by an appropriate conductor 11 to the power supply; the internal conductors of the plurality of coaxial cables represented generally at 13 are connected in common to a conductor 12 which, in turn, is connected to the high potential of the power supply 10. An appropriate resistive element may also be connected in circuit with the conductor 12 as shown at 14.

The multiplicity of coaxial cables 13 afford a relatively low inductance and a desirable pulse-forming network which has the capability of forming pulses having desirable characteristics for pulsing a gas laser such as molecular nitrogen, for example. The plurality of coaxial cables 13 are connected to a coaxial spark gap switch 15 which, as illustrated schematically, has a gap between two high potential electrodes and performs the function of a switch. The gap at 16 may be filled with an appropriate gas such as nitrogen, for instance, and the coaxial spark gap switch may comprise a plurality of like spark gaps connected in parallel as required by the desired power capabilities of the arrangement of apparatus. The coaxial spark gap switch 15 together with the plurality of cables 13 form a pulse generator comprising the two principal elements of a pulse-forming network and a switch means.

The output side of the coaxial spark gap switch 15 is connected to a second plurality of coaxial cables connected in parallel 17 in much the same manner as the plurality of coaxial cables described previously at 13. The plurality of coaxial cables 17 may be the same in number as the plurality of coaxial cables represented at 13 such as ten or more in number. The coaxial cables 17 are of such length, configuration, and electrical characteristics as to provide a pulse-charging coupling to the laser assembly where the lasing medium is contained.

The inner or high potential conductors of the plurality of coaxial cables 17 are connected at 17a to a copper electrode which is a part of the laser assembly. The copper electrode 19, in the form of a cylindrical annulus, is sealed at one end to a glass tubular section 20. The glass tubular section 20 is sealed at its other end to a Brewster angle window 22. The remaining end of the copper electrode 19 is sealed to another glass tubular section 21 of elongate form. The opposite or remaining end of the glass tubular section 21 is sealed to a second copper electrode 23 which, similar to the previously described copper electrode 19, is of a cylindrical annular form. The remaining end of the copper electrode 23 is sealed to a short section of cylindrical glass tubing 24 which, in turn, has its remaining end sealed to a Brewster angle window 25.

Enclosing the outer portion of the elongate glass section 21, is an electrical conductor 27 which may take the form of a braided shield, for instance. This braided shield conductor 27 is electrically connected through a suitable conductor 26 to the outside or ground potential of the plurality of coaxial cables 17 and is also electrically connected to the second copper electrode 23. A reflective mirror 28 is provided adjacent the Brewster angle window 22 to reflect laser energy which is emitted therefrom back down the length of the laser tube assembly and out the opposite Brewster angle window. A partially reflective mirror 29 performs the dual function of reflecting a portion of the emitted laser energy and transmitting a portion of it therethrough whence it is employed as desired.

OPERATION

In operation the power supply 10 provides a source of electrical power connected to the pulse-forming network in the form of the plurality of coaxial cables 13. The coaxial cables 13 are designed to have a desirable impedance comprising ohmic resistance as well as capacitive and inductive reactances for the apparatus to operate at optimum efficiency in the transfer of electrical power to the laser tube assembly for producing power output in the form of laser energy. Accordingly, the power supply 10 charges the plurality of coaxial cables 13 and when the charge of energy upon the plurality of coaxial cables 13 reaches a sufficient amplitude, conduction across the coaxial spark gap or plurality of gaps is caused so that the flow of electrical current is switched to the plurality of coaxial cables 17.

The plurality of coaxial cables 17 operate as a pulse-charging coupling connecting the switch means in the form of the coaxial spark gap switch or switches 15 to the gas within the laser tube assembly 18. The pulse-charging coupling in the form of the plurality of coaxial cables 17 is characterized by being adapted to accept the charge of pulses until the electrical energy of the charges is sufficient to overcome the impedance of the gas and to cause electrical conduction through the gas. Accordingly, when a plurality of coaxial spark gap switches are employed and the multiple conduction across such spark gap switches does not occur at precisely the same instant of time, the charges resulting from such multiple conduction will be received by the pulse-charging coupling 17; pulse energy is stored by the pulse-charging coupling 17 until the gas within the laser tube assembly 18 is caused to conduct, exciting the gas to a gas lasing level and producing laser power output. When the pulse-charged coupling 17 discharges through the gas medium within the laser tube assembly 18, conduction is caused from the copper electrode 19 through the elongate length of the laser tube assembly as represented principally by the glass section 21 and to the secondary electrode 23 which is operated effectively in the manner of a ground connection completing the circuit to ground and the power supply 10.

Accordingly, the plurality of coaxial cables as indicated at 17, FIG. 1 comprise a pulse-charging coupling which connects the switch 15 to the laser tube assembly 18 for conduction through the gas to be excited. As taught by the concept of the present invention, a pulse-charging coupling in the form of a plurality of coaxial cables is adapted to be charged and accumulate electrical energy from the pulses it receives until the accumulated charge overcomes the impedance of the gas and causes conduction through the gas.

It has been demonstrated by tested results that the pulse-charging coupling employed as taught and conceived by the present invention provides a significantly improved efficiency of operation of a laser where a gas is employed to receive pulses and produce a lasing action. The prior art practices generally have been implemented by a pulse generator means directly connected to the gas or other medium to be pulsed. This technique resulted in problems of impedance matching, lack of simultaneously switched pulses when a multiple switch means was employed such as a plurality of spark gaps, and a resultant loss of efficiency yielding diminished laser power output.

Figure 2:
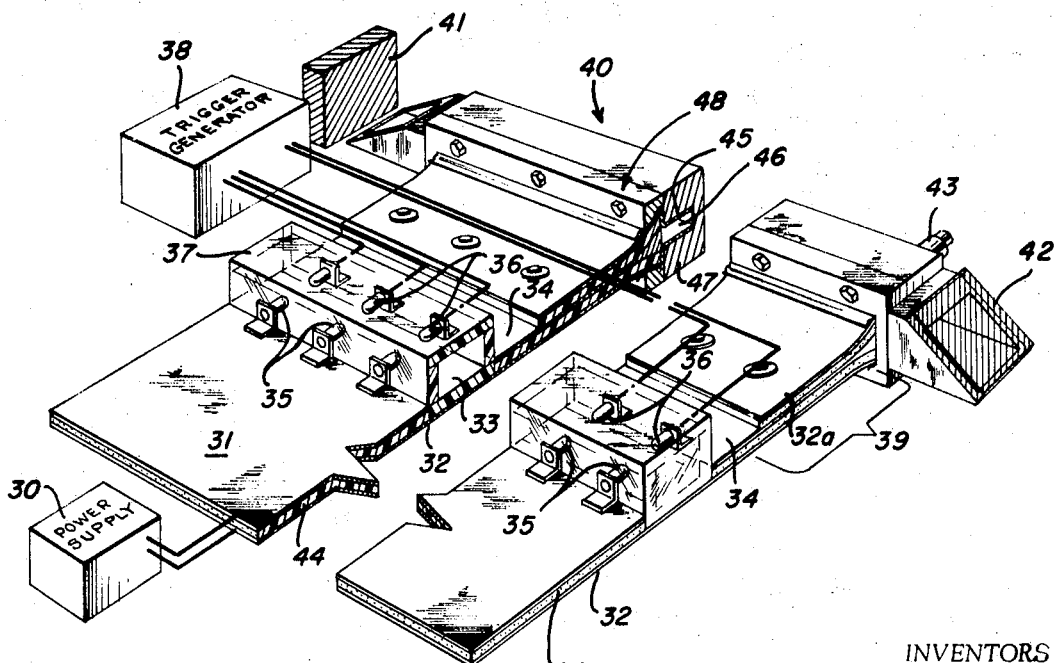
FIG. 2 is a perspective illustration of a parallel-plate, transmission line form embodiment of the present invention.

FIG. 2 illustrates a flat plate transmission line type of pulsed gas laser embodying the teachings an concepts of the present invention. In FIG. 2 a source of electrical power 30 is connected to two parallel electrically conductive plates 31 and 32. The plates 31 and 32 are usually arranged so that the high potential is carried by plate 31 while a ground potential return circuit path is established through plate 32. A discontinuity is shown in plate 31 as indicated generally in the gap area 33 of FIG. 2. The extent of the gap 33 is defined by a continuation of plate 31 in the form of plate 34.

Connected on either side of the gap 33 are shown multiple electrodes 35 and 36 oppositely positioned to form a plurality of spark gap pairs connected respectively, to plate 31 and to plate 34. The spark gap switches comprising the multiplicity of electrodes 35 and 36 may be connected to an independent electrical source such as that indicated generally at 38 to precisely control the instant at which conduction is caused to occur between the plurality of spark gap switches. When the additional potential of the independent electrical course is imposed across the spark gap switches, instantaneous conduction occurs.

The entire switch arrangement comprising a multiplicity of paired spark gap switches may be appropriately contained within an enclosure 37 which may be filled with air or an appropriate gas containing nitrogen, for instance. Such arrangement is advantageous in reducing corrosion and deterioration of the spark gap switch electrodes 35 and 36 as well as being advantageous in affording better control of the instant at which the spark gap switches may be caused to become conductive through the independent trigger source 38 as previously explained.

The plate 34 is electrically connected to the spark gap electrodes 36 and forms a conductive path to the laser tube assembly 40. The portion of the flat plate transmission line, indicated generally at 39 in the drawing of FIG. 2, comprises a pulse-charging coupling between the switch means of the pulse generating circuit and the laser tube assembly 40.

In the illustration of FIG. 2 a secondary conductive plate 32a is provided in substantially parallel relationship with respect to plate 32 and plate 34 and is insulated from plate 34 but conductively connected to plate 32 so that both plate 32 and 32a are maintained substantially at a ground potential. Accordingly, the pulse-charging coupling 39 comprises a balun line portion of the electrical circuit which converts the conductive path from single ground plane to a dual ground plane. The plates 32a, 34, and 32 are insulated as previously described by an appropriate insulating material 44 such as sheets of Mylar, for instance.

The pulse-charging coupling 39 is connected in conductive relationship to a laser assembly 40 which may contain an appropriate gas 46 such as molecular nitrogen, for example, within an elongate, slotted Teflon member 45 supported as shown relative to two electrically conductive members 47 and 48. A mirror 41 may be positioned at one end of the laser assembly 40 to reflect laser energy back down its length and out the window 42. Nitrogen or other appropriate gas may be admitted to area 46 of the laser cell assembly 40 through an evacuation and gas fill connection 43.

OPERATION

In operation, the source of electrical power 30 impresses a high potential across the plates 31 and 32. When the potential reaches a sufficient amplitude, the spark gap switches as represented by the plurality of electrodes 35 and 36 are caused to become conductive under the control of an independently operative trigger such as that shown, for example, at 38. The action of the trigger 38 creates multiple conductive paths between pairs of electrodes at a time determined by energization of the trigger means. The conduction of electrical current across the spark gap switch means energizes the pulse-charging coupling as indicated in the general area of 39 and comprising the lower plate 32, the high potential parallel plate 34, and the dual ground plane plate 32a. The pulse-charging coupling in the form of a balun line in FIG. 2 accordingly becomes energized and, when a sufficient amplitude of potential differential is developed between its high potential conductor and ground potential, a conductive path is created from plate 34, through the gas-filled gap 46 contained in the gas laser assembly 40, through the conductors 47 and 48, and to plates 32 and 32a. Accordingly, a dual conductive path is instantaneously and symmetrically created from the high potential plate 34 to the respective ground potential plates 32 and 32a, which are equally spaced on top and on bottom. This action occurs along the full length of the laser tube assembly 40 which, in the case of the illustration of FIG. 2, is an elongate laser cell containing molecular nitrogen gas.

Figure 3A:
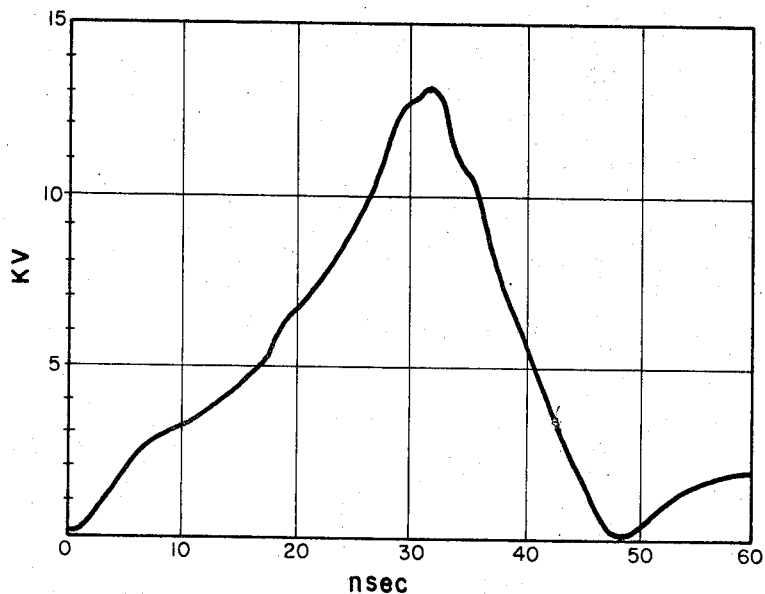
FIGS. 3a and 3b illustrate the actual operation of the pulse-charging coupling in a nitrogen gas laser embodiment of the present invention.
Figure 3B:
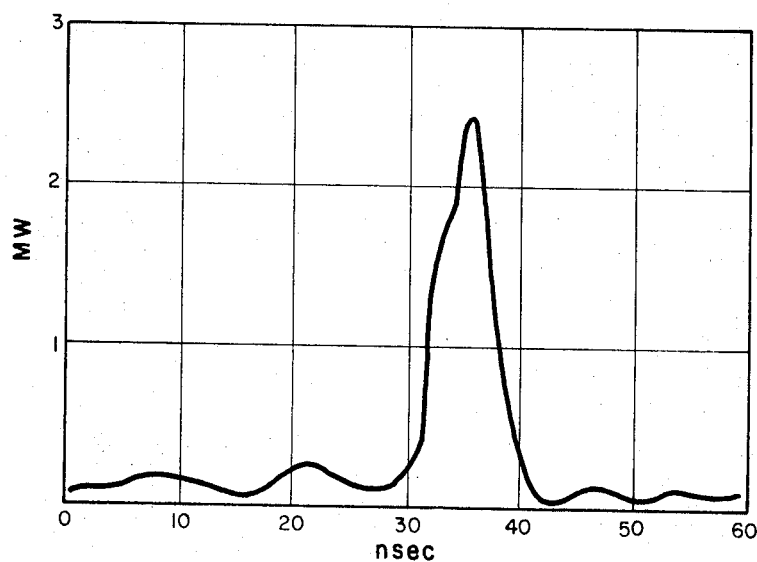

FIGS. 3a and 3b illustrate the action and operation of the pulse-charging coupling of the present invention as it has been found to perform in a particular nitrogen gas laser embodiment. Both FIGS. 3a and 3b are shown in the same time scale gradient to indicate nanoseconds. The zero time point in both FIGS. 3a and 3b represents the time at which the plurality of spark gap switches become conductive; FIG. 3a represents the change of potential of the pulse-charging coupling of the present invention relative to time, while FIG. 3b represents the laser pulse in terms of megawatts of power output relative to the identical time scale.

Since it has been established and recognized that the laser power output pulse and the conduction of current through the lasing material occur simultaneously, it can be reasonably assumed that the current pulse through the lasing material, such as molecular nitrogen in this case, is of substantially the same form and general configuration as the laser power output pulse illustrated. Empirical results confirm that the particular nitrogen gas laser assembly whose operation is represented by FIG. 3a and 3b exhibits a static DC breakdown voltage of the order of approximately 2000 volts. That is to say, that if the potential impressed upon the lasing nitrogen gas medium were to be slowly increased, the nitrogen gas would break down, and conduct, when such potential reached an amplitude of approximately 2000 volts.

As can be seen from FIG. 3a, when the spark gap switches begin to conduct at zero time, the pulse-charging coupling builds up to an amplitude of the order of 2000 volts in approximately 5 nanoseconds. However, the nitrogen gas lasing material does not break down and become conductive at that point. As is clearly illustrated in FIG. 3a, the potential of the pulse-charging coupling continues to rise from approximately 2000 volts to more than 13,000 volts for a period of time starting approximately 5 nanoseconds after the spark gap switches have begun conducting, and extending to approximately 30 nanoseconds after the spark gap switches have become conductive.

As may be seen from FIG. 3b, at a point in time approximately 30 nanoseconds after the spark gap switches have become conductive, the nitrogen gas laser material begins to break down, becomes conductive, and produces the laser power output indicated by the laser pulse of FIG. 3b in the period approximately between 30 and 40 nanoseconds of that illustration. Accordingly, the pulse-charging coupling of the present invention operates to permit a buildup of significantly increased potential beyond the static DC breakdown voltage, which in the apparatus whose operation is represented graphically by FIGS. 3a and 3b was of the order of only 2000 volts.

Because of the operation of the pulse-charging coupling employed as taught by the present invention, the gas lasing material is enabled to withstand a significant increase in potential before it breaks down, becomes conductive, and produces a laser power output pulse. This significant increase in potential which the pulse-charging coupling impresses upon the gas lasing medium before it is caused to lase may be termed "overvoltage." . By "overvoltage" is meant that increased amplitude of potential which the pulse-charging coupling of the present invention enables the lasing material to withstand before conduction occurs; the "overvoltage" may be determined by the difference between the so-called static breakdown voltage and the maximum amplitude of voltage attained before the laser pulse occurs.

In the particular apparatus whose operation is represented in FIGS. 3a and 3b, it will be seen that the measure of overvoltage is the difference between approximately 2000 volts and 13,000 volts, indicating that an overvoltage of more than 11,000 volts was impressed upon the lasing material before the lasing pulse occurred. As will be appreciated readily by those skilled in the art, this order of increased potential which is impressed across the lasing material before the lasing phenomenon occurs, results in significantly increased laser power output. As indicated in FIG. 3b, the laser power output of approximately 2.5 megawatts was realized with the apparatus whose operation is represented.

The data for FIGS. 3a and 3b was derived by photographing the traces of 2 Tektronix 519 oscilloscopes which were synchronized for identical starting times and sweep speeds. The impedance of the coupling line was $0.070\Omega$. The pressure of nitrogen gas in the laser tube was 35 Torr.

The DC breakdown voltage of the nitrogen gas in the laser tube at 35 Torr pressure was 1800 volts. For rapidly rising voltage pulses, the gas can tolerate a voltage considerably in excess of this value for a finite length of time, i.e. the time for an electron to appear and form an avalanche. In the extremely minute interval of the breakdown time, the coupling line is pulse charged as shown by the voltage rise for the first 30 nanoseconds of FIG. 3a. After this time, the voltage on the gas decreases as the gas begins to conduct appreciable current. The laser pulse is coincident in time with this increase of current, i.e. this voltage decrease, as can be seen from FIGS. 3a and 3b.

The voltage rise in the first 10 nsec of FIG. 3a is slow. It is inhibited by the "resistive phase" during which time the resistance associated with the arcs of the spark gaps fall from a very high value to a value small compared with the total line impedance, $Z_c+Z_s$, where $Z_c$ & $Z_s$ are the impedances of the coupling line and the storage lines, respectively. In this time interval, $3T_c$, where $T_c$ is the transmit time of the coupling line, the voltage rise is also governed by the equations which relate the discharge of one transmission line into another line. The time constant associated with this buildup is $L_s/Zs+Z_c$ where $L_s$ is the inductance of the switch. Beyond this first few nanoseconds, lumped circuit theory may be used to describe the pulse charging of the coupling line.

Figure 4:
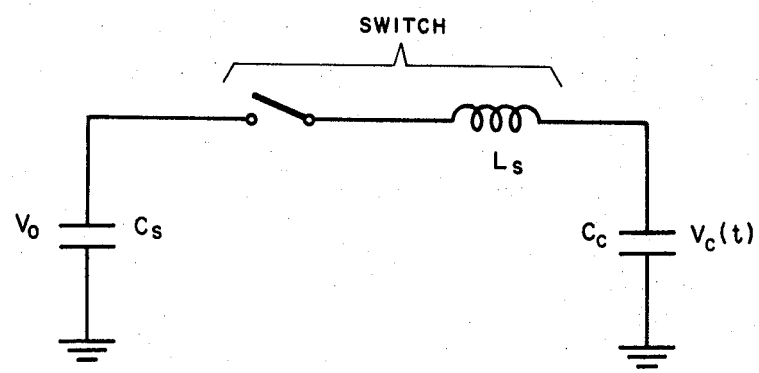
FIGS. 4 and 5 illustrate equivalent circuit parameters.

In the circuit diagram of FIG. 4, $C_s$ and $C_c$ represents the capacitance of the storage and the coupling line respectively. The inductance of the spark gap switch is $L_s$. The capacitor $C_s$ is charged to a voltage $V_o$. When the switch is closed, the voltage buildup on the coupling section is given by $$V_c(t) = \frac{V_o}{1+\frac{C_c}{C_s}}[1-\cos \omega_r t] \tag{1}$$

where $$\omega_r = \left(\frac{C_s C_c}{C_s+C_c} L_s\right)^{-\frac{1}{2}} \tag{2}$$

$\omega_r$ is a resonant frequency associated with this LC circuit. Curve fitting of the voltage rise of FIG. 3a (beyond the first 10 nsec) to Eq. 1 yields a value of 10 nH for the effective switch inductance.

If the laser tube was connected directly to the spark gap switches, the current through the gas would be concentrated at the twenty discrete points, each point arising from a gap. The coupling line is inserted between the spark gap and the tube as a means of obtaining a more uniform discharge by isolating the discharge from these discontinuities, and providing a continuous electrode to the gas. The high voltage waveforms radiate radially from the singularities of the spark-gap switch into the coupling line. The latter is sufficiently long such that these voltage irregularities have comparatively disappeared at the laser tube.

The usage of a coupling section isolating the spark gaps from the laser tube can lead to a relaxation of the number of gaps required for switching. Instead of the gaps feeding a laser tube directly, where as many switches as possible are desired, the main function of the switches is to pulse charge a coupling line. Experimental results show that four gaps instead of twenty are sufficient to pulse charge the line without any appreciable reduction of laser output power.

Figure 5:
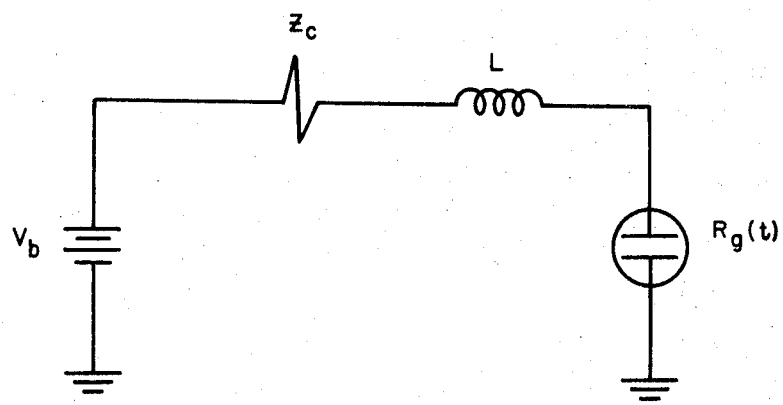

The coupling line serves as the primary electrical pulse generator for the laser gas for at least the first $2T_c$ (7 nsec) of time after breakdown, where $T_c$ is the coupling section transit time. This time interval contains the most important portion of the laser discharge, since the peak of population inversion density occurs within the first few nanoseconds. Thus the laser characteristics are controlled by the impedance of the coupling line $Z_c$, the voltage at breakdown $V_b$ and any residual inductance in the circuit. A schematic representation of the coupling transmission line and the laser tube is shown in FIG. 5. The coupling capacitor $C_c$ is pulse charged to a voltage $Vc(t) = V_b$ when the laser gas breaks down and is replaced by voltage $V_b$ and a resistance $Z_c$ corresponding to the characteristic impedance of the transmission line. The laser gas is represented by a time varying resistor $R_g(t)$. The total inductance of the coupling section and the laser tube is shown as $L$. As a first approximation, the continuation of energy fed into the capacitor $C_c$ from the storage capacitor $C_c$ during the laser pulse width may be neglected. The circuit equation for FIG. 5 is $$V_b = L\frac{dI}{dt}(t) + Z_c I(t) + R_g(t) \cdot I(t) \tag{3}$$

For high laser output power, it is desirable to maximize the value of the last term, i.e., the voltage drop across the gas, and the power fed into the gas for the first few nanoseconds of the discharge.

When the circuit is not inductively limited, i.e. the first term of Eq. 3 is small compared to $V_h$, decreasing the magnitude of the second term, i.e. the voltage drop across the characteristic impedance can increase the laser power. This is realized by decreasing the coupling impedance $Z_c$.

Though in some prior art arrangements it has been possible to realize virtual simultaneous conduction by multiple spark gap switches having as many as 20 discrete spark gaps, for example, there nonetheless exists in such multiple spark gap arrangements the possibility and problem of lack of simultaniety in their operation. This problem is obviated by the present invention.

Moreover, if, as was common in the prior art, a multiple spark gap switch were connected directly to an elongate gas laser assembly of the type shown in the embodiment of FIG. 2, a further difficulty arose in that the number of conductive breakdown areas along the elongate laser assembly could be equal in number to the multiple pairs of spark gaps employed. This would result in diminished laser power output and a highly undesirable result as will be appreciated by those knowledgeable in the art. For example, if 20 discrete pairs of spark gaps were employed in a flat plate type of elongate nitrogen gas laser, it is possible, and even likely, that twenty separate areas of conduction and lasing action would be created along the elongate slot of the laser assembly in which the lasing molecular nitrogen is contained.

Thus, it may be seen that the present invention obviates a number of disadvantages of prior art arrangements. Among these are, that the pulse-charging coupling of the present invention, when employed in an embodiment as taught and conceived by the present invention, obviates any lack of simultaneity which may occur by reason of the use of multiple switch means; it eliminates multiple lasing areas in the lasing material itself, assuring simultaneous conduction down the full length of elongate laser assemblies which may be as much as one or two meters long; further, it makes it possible for a significant order of increased overvoltage to be impressed upon the lasing material itself with a resultant significantly increased order of laser power output.

Additionally, the pulse-charging coupling as conceived and taught by the present invention is readily adaptable to desirable symmetrical configurations which further assure simultaneous pulsing and optimum laser power output.

Obviously many modifications and variations of the present invention are possible in the light of the above teachings. It is therefore to be understood that within the scope of the appended claims the invention may be practiced otherwise than as specifically described.

We claim:

1. An improved apparatus for exciting a laser material comprising:
   a gas energizable by the conduction of pulsed electrical current for producing laser excitation energy;
   a source of electrical power;
   a pulse-forming network connected to said source of electrical power;
   switch means connected to said pulse-forming network, said means being controllably actuatable for the conduction of pulses of electrical current flow from said network; and
   a pulse charging coupling connecting said switch means to said gas, said coupling having an impedance which permits it to develop a substantial overvoltage prior to gas breakdown to serve as the primary electrical pulse generator for the gas for substantially the first $2T_c$ after initiation of breakdown of the gas, where $T_c$ is the pulse charge coupling transient time, and $2T_c$ is the time necessary to achieve peak population inversion of the gas.

2. An improved apparatus for exciting a laser material as claimed in claim 1 wherein said switch means comprises a plurality of means for substantially simultaneous conduction of pulses of electrical current flow thereacross.

3. An improved apparatus for exciting a laser material as claimed in claim 2 wherein said switch means comprises a plurality of spark gap.

4. An improved apparatus for exciting a laser material as claimed in claim 3 wherein said spark gaps are contained within a selected gas medium.

5. An improved apparatus for exciting a laser material as claimed in claim 1 wherein said pulse-charging coupling comprises a portion of a transmission line.

6. An improved apparatus for exciting a laser material as claimed in claim 5 wherein said pulse-charging coupling comprises a portion of a coaxial transmission line.

7. An improved apparatus for exciting a laser material as claimed in claim 6 wherein said coaxial transmission line is connected to switch means comprising coaxial spark gaps.

8. An improved apparatus for exciting a laser material is claimed in claim 5 wherein said pulse-charging coupling comprises a portion of a parallel-plate transmission line.

9. An improved apparatus for exciting a laser material as claimed in claim 5 wherein said pulse-charging coupling comprises a double ground plane balun line.